(12) United States Patent
Voyer et al.

(10) Patent No.: US 8,096,575 B2
(45) Date of Patent: Jan. 17, 2012

(54) SET STRUCTURE SYSTEMS

(75) Inventors: Craig Paul Voyer, Jackson, MI (US); Jeffrey Sadao Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 260 days.

(21) Appl. No.: 12/478,886

(22) Filed: Jun. 5, 2009

(65) Prior Publication Data

US 2010/0308564 A1    Dec. 9, 2010

(51) Int. Cl.
B60R 21/16    (2006.01)

(52) U.S. Cl. ................................... 280/728.2

(58) Field of Classification Search ............ 280/728.2, 280/728.3, 730.1, 732
See application file for complete search history.

(56) References Cited

U.S. PATENT DOCUMENTS

| | | | |
|---|---|---|---|
| 3,863,305 A | 2/1975 | Jaarsma | |
| 4,167,996 A | 9/1979 | Cutter | |
| 4,180,152 A | 12/1979 | Sefeik | |
| 5,133,444 A | 7/1992 | Thomason | |
| 5,535,999 A | 7/1996 | Ford | |
| 5,560,309 A | 10/1996 | Conley, Jr. et al. | |
| 5,890,733 A * | 4/1999 | Dillon | 280/730.2 |
| 6,193,271 B1 * | 2/2001 | Shimane | 280/728.3 |
| 6,269,934 B2 | 8/2001 | Baker | |
| 6,817,627 B2 * | 11/2004 | Galmiche et al. | 280/730.1 |
| 6,951,348 B2 * | 10/2005 | Enders | 280/728.2 |
| 6,971,667 B2 * | 12/2005 | Enders et al. | 280/730.1 |
| 7,261,318 B2 * | 8/2007 | Enders | 280/732 |
| 7,370,879 B2 * | 5/2008 | Hotta et al. | 280/730.1 |
| 7,490,710 B1 | 2/2009 | Weskamp et al. | |
| 7,798,517 B2 * | 9/2010 | Ishida | 280/732 |
| 2001/0001999 A1 | 5/2001 | Baker | |
| 2003/0213429 A1 | 11/2003 | Kreuzer | |

* cited by examiner

*Primary Examiner* — Paul N Dickson
*Assistant Examiner* — Robert A Coker
(74) *Attorney, Agent, or Firm* — Dinsmore & Shohl LLP

(57) ABSTRACT

A vehicle includes an instrument panel module including a receiving bracket. An airbag assembly includes an attachment bracket. The receiving bracket and attachment bracket have contact surfaces that provide a datum that guides the airbag assembly from an unsecured position toward a final installation position.

14 Claims, 9 Drawing Sheets

SET STRUCTURE SYSTEMS

TECHNICAL FIELD

The present specification generally relates to assembly line systems and, more specifically, to set structure systems for use in assembly line systems.

BACKGROUND

Assembly line systems typically include a sequential adding of parts to create a product, such as a vehicle. The parts move down the assembly line from one station to another station.

While automation is on the rise, some parts continue to be manually installed. This manual installation may include an installer holding a part in place while performing some form of connecting operation, such as installing fasteners to connect one part to another.

Some parts must be installed in relatively hard to reach positions, or may be difficult to see when in position for installation. One such part may be a knee airbag assembly for a motor vehicle. The knee airbag assembly is typically installed in front of a driver's or passenger's knees, either at the bottom of a steering column under an instrument panel or under a glove box at the passenger's side. Referring to FIG. 1, an installer 1 may locate the knee airbag assembly 2 in a temporary pre-installation position as shown where the knee airbag assembly hangs loosely from a hook 3. Referring to FIG. 2, the installer 1 rotates the knee airbag assembly 2 into an installation position and holds the knee airbag assembly in place with one hand to fasten the knee airbag assembly into its permanent position on an instrument panel 4 with the other hand. Efforts to secure components in such a conventional manner may be cumbersome and time consuming.

SUMMARY

In one embodiment, a method of installing an airbag assembly to an instrument panel module as a vehicle moves along an assembly line is provided. The method includes positioning the airbag assembly at an underside of the instrument panel module; engaging a set structure carried by the airbag assembly and the instrument panel module to place the airbag assembly in a final installation position; and releasing the airbag assembly, the set structure configured to maintain the airbag assembly in the final installation position as the vehicle moves along the assembly line.

In another embodiment, an assembly for use in a vehicle includes an instrument panel module including a receiving bracket including a hook receiving slot and a protrusion. An airbag assembly includes an attachment bracket including a hook portion and an opening. During assembly, the hook receiving slot is sized and arranged to receive the hook portion of the attachment bracket and the opening of the attachment bracket being sized and arranged to receive the protrusion to maintain the airbag assembly in a final installation position.

In yet another embodiment, a vehicle includes an instrument panel module including a receiving bracket. An airbag assembly includes an attachment bracket. The receiving bracket and attachment bracket have contact surfaces that provide a datum that guides the airbag assembly from an unsecured position toward a final installation position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
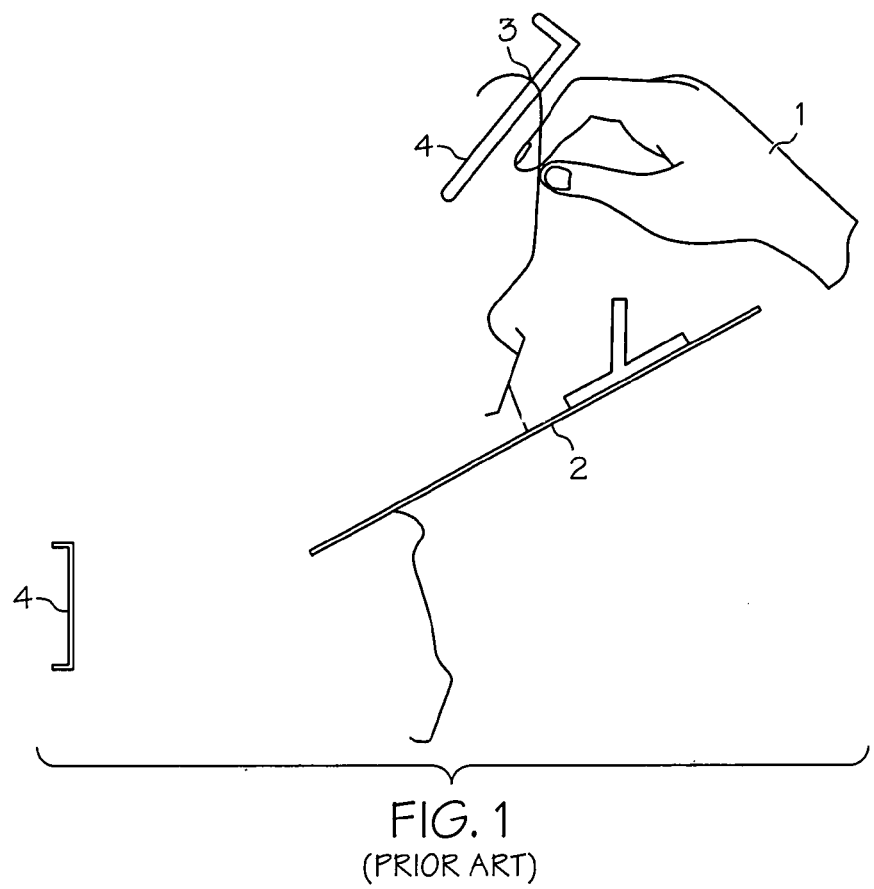
FIGS. 1 and 2 are diagrammatic side views of an embodiment of an airbag installation.
Figure 2:
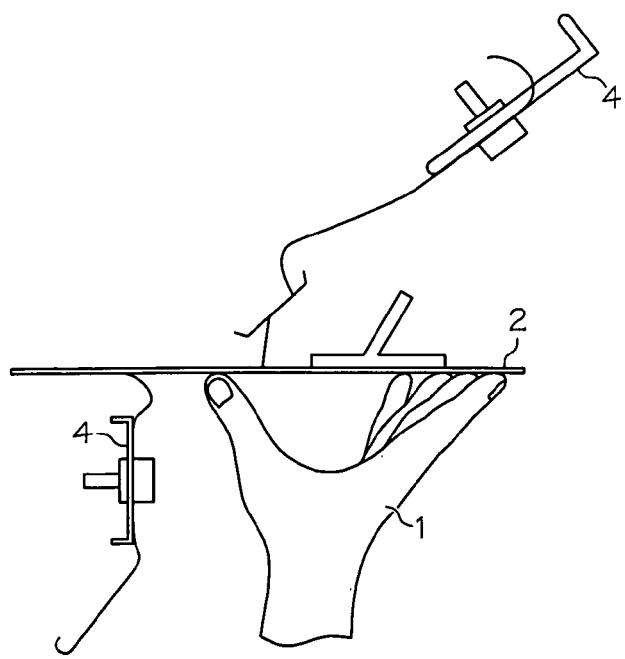
Figure 3:
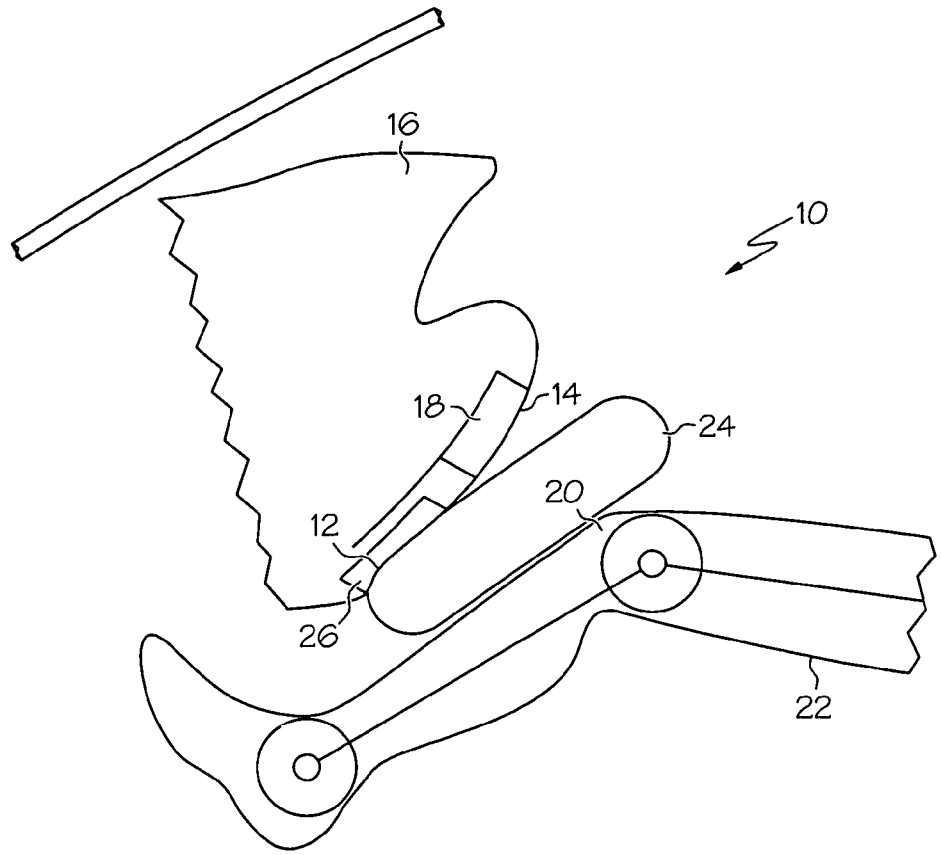
FIG. 3 is a diagrammatic side view of an embodiment of an airbag assembly installed to an instrument panel module.

FIG. 3 generally depicts an exemplary embodiment of a vehicle interior 10 including a passenger side airbag assembly (e.g., a knee airbag assembly), generally referred to as element 12. The airbag assembly 12 may be installed at an underside 14 of an instrument panel module 16, near a glove box 18. The airbag assembly 12 may be located at approximately the same height of a knee 20 of a passenger 22. The airbag assembly 12 may be provided with an airbag 24 which can inflate and deploy in front of the knee 20 of the passenger 22. An inflator (not shown) may supply a gas to the airbag 24 for inflation.

The airbag 24 may be stored within an airbag housing 26 in a folded configuration and covered, at least in part, by the instrument panel module 16. Gas may be supplied by the inflator into the airbag 24 that is stored in its folded state when an acceleration of the vehicle detected by a sensor (not shown) reaches or exceeds a predetermined threshold value. The airbag 24 may then inflate and deploy so as to intervene between the instrument panel module 16 and the knee 20 of the passenger 22 as shown by FIG. 3.

Figure 4:
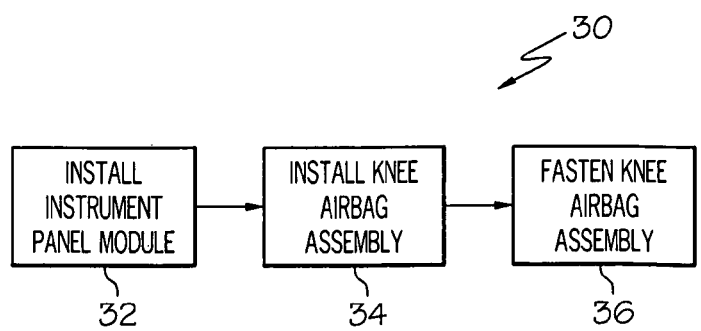
FIG. 4 is an embodiment of a process for installing an airbag assembly to an instrument panel module.

Referring to FIG. 4, an exemplary vehicle assembly process 30 is illustrated in simplified form where the airbag assembly 12 is installed at the underside 14 of the instrument panel module 16. At step 32, the instrument panel module 16 is installed within the interior of the vehicle 10. The instrument panel module 16 may include components such as the glove box 18 on the passenger's side, various instrument panel reinforcements, a steering wheel and an instrument cluster on the driver's side. The steering wheel and instrument cluster may or may not be installed at step 32, but instead may be installed at one or more downstream stations. The instrument cluster may include various gauges such as a speedometer, tachometer, odometer, fuel gauge, and indicators such as a gear shift position, seat belt warning light, parking brake engagement warning light, engine malfunction light, etc. Heating, ventilation controls and vents, lighting controls, audio equipment and navigational controls may also be included with the instrument control module 16.

At step 34, the airbag assembly 12 is manually positioned at its installation position at the underside of the instrument panel module 16 by an installer. As will be described in greater detail below, a set structure system is provided that holds the airbag assembly 12 within the vehicle interior 10 and in its installation position for a downstream connecting operation without any need for repositioning the airbag assembly once the airbag assembly is located in the installation position. In some embodiments, the set structure system allows the installer to manually place the airbag assembly 12 in the installation position without visual observation due to its position underneath the instrument panel module 16.

At step 36, the installer (or a different installer) fastens the airbag assembly 12 to the instrument panel module 16, for example, using fasteners. As used herein, the term "fasten," "fastens" or "fastening" refers to an operation where the component to be installed is secured to the receiving component such that the component to be installed cannot be removed from the receiving component without damaging one or both of the components without undoing the fastening. The set structure locates the airbag assembly 12 such that the connection step 36 can be performed without visually observing the airbag assembly and without moving the airbag assembly. In some embodiments, steps 34 and/or 36 are performed as the vehicle 10 moves along the assembly line.

Figure 5:
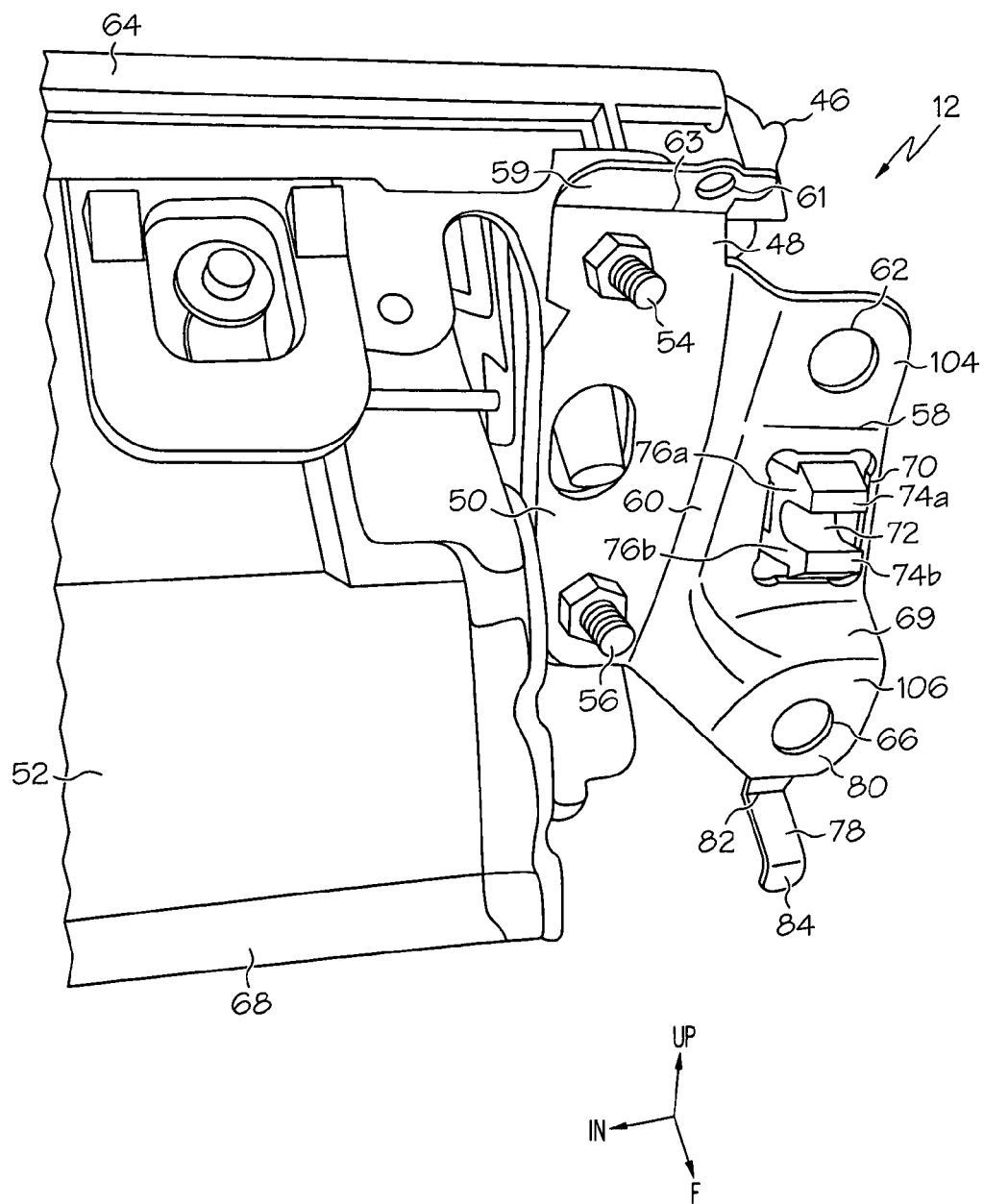
FIG. 5 is a perspective, partial view of an embodiment of an airbag assembly showing an attachment bracket.
Figure 6:
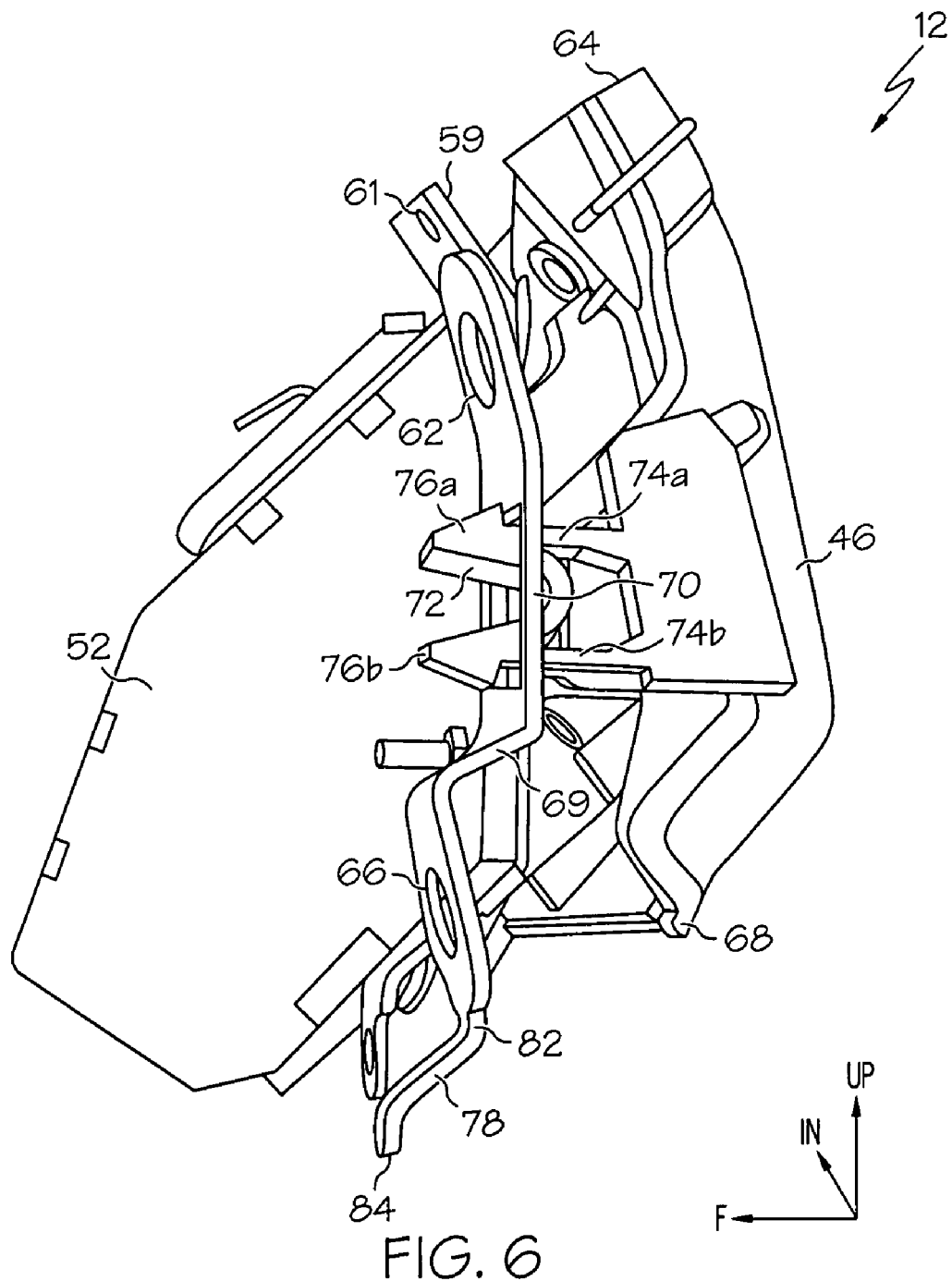
FIG. 6 is an end view of the airbag assembly of FIG. 5.

Referring to FIGS. 5 and 6, one end of the airbag assembly 12 is illustrated including part of the set structure system for use in positioning the airbag assembly 12 on the instrument panel module 16. The arrows UP, IN and F denote upward, widthwise inward and forward directions, respectfully, with respect to the vehicle 10. As used herein, the term upward denotes in the upward direction of the vehicle, inward denotes in the inward widthwise direction of the vehicle and forward denotes forward in the direction of the vehicle. It should be noted that while one end of the airbag assembly 12 is illustrated, both ends of the airbag assembly may include similar set structure yet suitable for opposite ends of the airbag assembly. The set structure is located on both the airbag assembly 12 (i.e., the component to be installed) and the instrument panel module 16 (i.e., the receiving component).

The airbag assembly 12 includes an airbag door assembly 46 (e.g. formed of a resin material) through which the airbag (not shown) exits during deployment and an attachment bracket 48. The attachment bracket 48 includes a connecting portion 50 that is connected to a box case 52 that supports the airbag. Any suitable connecting structure may be used to connect the attachment bracket 48 to the box case 52. In the illustrated embodiment, fasteners 54 and 56 are used to connect the attachment bracket 48 to the box case 52 others include adhesives, welding, etc.

Extending forward of the connecting portion 50 is a bracket hanging portion 59 located at the top of the connecting portion. In one embodiment, the bracket hanging portion 59 extends integrally from the connecting portion 50 and connected to the connecting portion by a bend 63. In another embodiment, the bracket hanging portion 59 may be separate from the connecting portion 50 and, for example, connected directly to the box case 52 or the airbag door assembly 46. The bracket hanging portion 59 is situated at an angle to the horizontal (e.g., about 90 degrees) when the airbag assembly is installed. The bracket hanging portion includes an opening 61 extending therethrough.

The attachment bracket 48 includes a mounting portion 58 adjacent the connecting portion 50. The mounting portion 58 is offset from the connecting portion 50 by an offset region 60 that transitions generally forward in a direction away from the airbag door assembly 46 from the mounting portion to the connecting portion. The mounting portion 58 includes an upper opening 62 that is located near a top 64 of the airbag assembly 12 and a lower opening 66 that is located near a bottom 68 of the airbag assembly. The lower opening 66 is offset from the upper opening 62 by a forward extending stepped portion 69 forming a somewhat dome or plateau shape. A clip opening 70 is positioned between the upper opening 62 and the lower opening 66. The clip opening 70 is sized and arranged to receive a clip 72 protruding from a back of the airbag door assembly 46. The clip 72 may, in some embodiments, be formed integrally with the airbag door assembly 46 (e.g., during a molding process). The clip 72 includes a pair of fingers 74a and 74b, each having an enlarged head portion 76a and 76b that are sized to catch an edge of the clip opening 70 and inhibit removal of the clip from the clip opening.

The attachment bracket 48 includes a hook portion 78 extending outwardly from a lower edge 80 of the mounting portion 58. The hook portion 78 includes a bend 82 such that the hook portion extends generally forward, away from the airbag door assembly 46 and a crook portion 84 at an end of the hook portion. In some embodiments, the hook portion 78 may include a lengthwise extending axis through the middle of the hook portion that is substantially aligned with a center of the upper and lower openings 62 and 66. In another embodiment, one or both upper and lower openings 62 and 66 may have centers that are offset from a lengthwise extending axis of the hook portion 78.

In one embodiment, the attachment bracket 48 is formed of a single material with the connecting portion 50, the mounting portion 58, the bracket hanging portion 59 and the hook portion 78 all formed of the same material, such as a metal or plastic material. In other embodiments, the attachment bracket may be formed of multiple materials or parts. Any suitable method or combination of methods may be used to form the attachment bracket 48, such as bending, machining, casting, molding, stamping, welding, etc. In some embodiments, the attachment bracket 48 is formed entirely of a metal sheet material formed into the attachment bracket 48.

Figure 7:
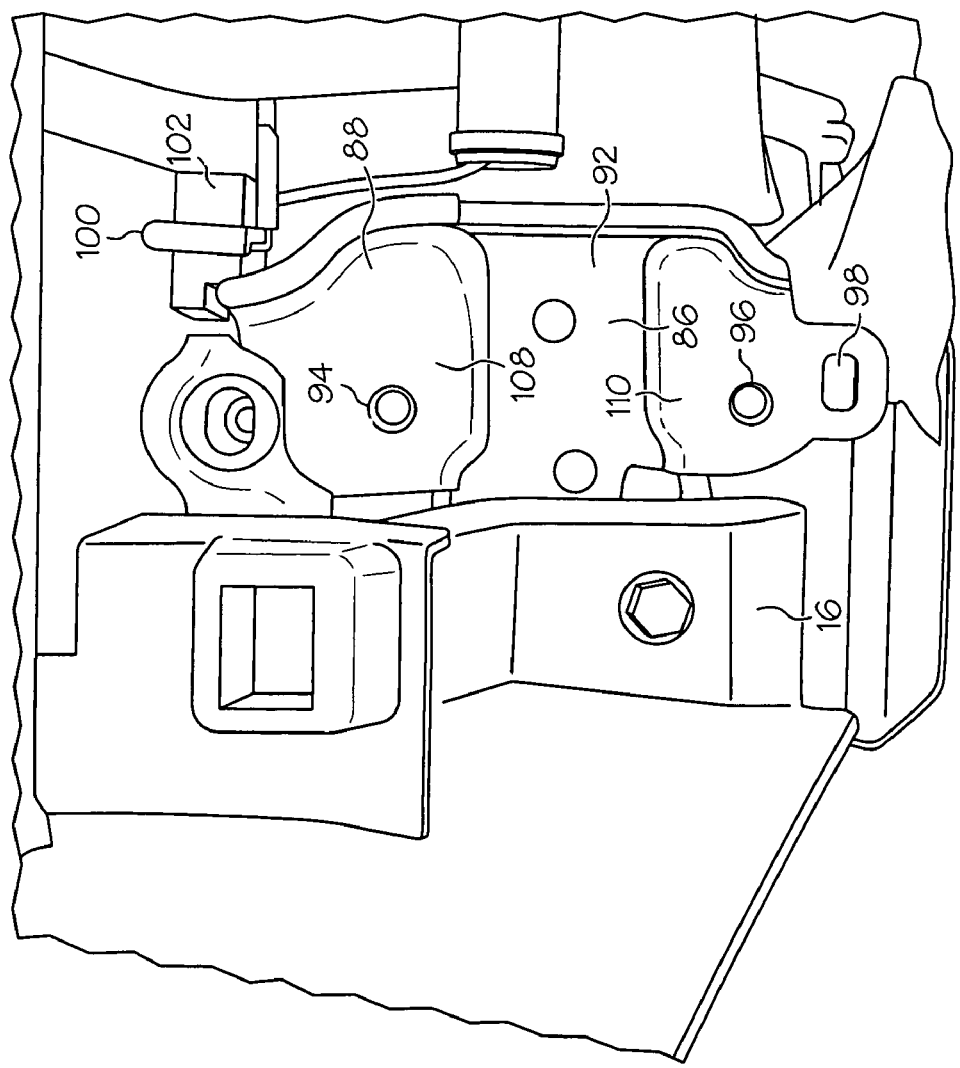
FIG. 7 illustrates an embodiment of a receiving bracket for receiving the attachment bracket of FIG. 5.

Referring to FIG. 7, a glove box region of the instrument panel module 16 includes a receiving bracket 86 affixed to the instrument panel module 16. While only one receiving bracket 86 is illustrated, the instrument panel module 16 may have more than one receiving bracket such as two receiving brackets, one for each end of the airbag assembly 12 that are spaced apart in the widthwise direction of the vehicle 10.

The receiving bracket 86 includes an upper portion 88, a lower portion 90 and an intermediate portion 92 that is offset forward of the upper and lower portions. An upper opening 94 is located at the upper portion 88 and a lower opening 96 is located at the lower portion 90. A hook receiving slot 98 is located below and forward of the upper opening 94 and the lower opening 96. The hook receiving slot 98 is sized and located to receive the hook portion 78 of the attachment bracket 48. In the illustrated embodiment, the hook receiving slot 98 is somewhat elongated in the widthwise direction forming a somewhat oval shape. The hook receiving slot 98 can be any other suitable shape and size to receive the hook portion 78 of the attachment bracket 48. As can be seen, both upper opening 94 and lower opening 96 have a center that are offset from a midpoint of the hook receiving slot 98. In other embodiments, the centers of the upper opening 94 and the lower opening 96 may be substantially aligned with a midpoint of the hook receiving slot 98.

A protrusion 100 is located adjacent the receiving bracket 86. The protrusion 100 is attached to the instrument panel module 16 by a bracket 102. The protrusion 100 and bracket 102 are separate from the receiving bracket 86. In some embodiments, the protrusion 100 has a lengthwise axis that is oriented substantially horizontal, however, other orientations are possible. Additionally, while a pin-shaped protrusion 100 is illustrated, other protrusion types may be used such as a mushroom-shaped protrusion with an enlarged head portion.

Figure 8:
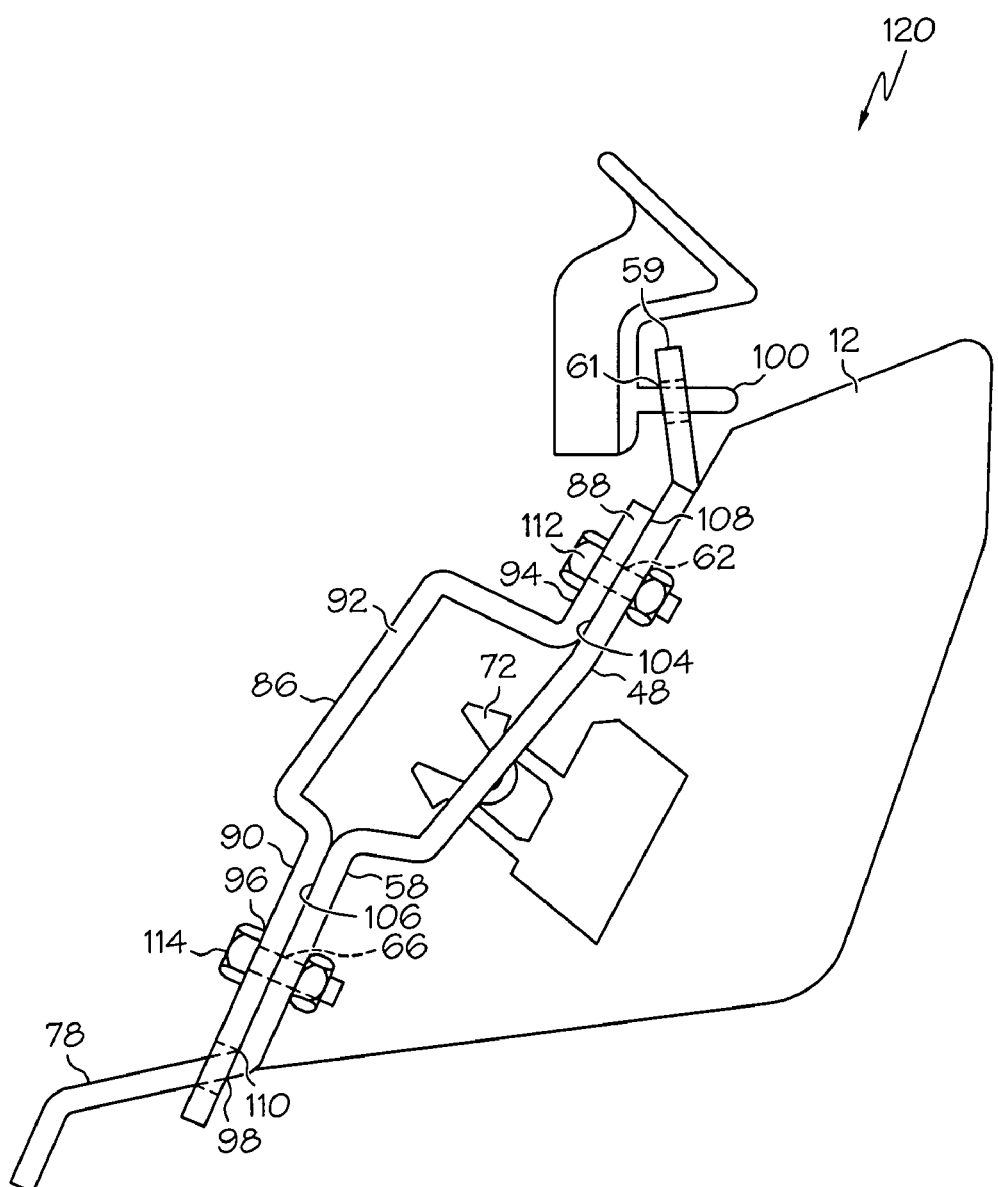
FIG. 8 is a diagrammatic, side view of the airbag assembly of FIG. 5 connected to the receiving bracket of FIG. 7.

Referring to FIG. 8, the attachment bracket 48 is shown fastened to the receiving bracket 86. The protrusion 100 is received within opening 61 of the bracket hanging portion 59 and the hook portion 78 is received within the hook receiving slot 98. The upper opening 62 and lower opening 66 of the mounting portion 58 are aligned with the upper opening 94 and lower opening 96 of the receiving bracket 86. The intermediate portion 92 is offset from the upper portion 88 and lower portion 90 to define a U-shaped recess that receives the clip 72 such that surfaces 104 and 106 of the mounting portion 58 of the attachment bracket 48 engage surfaces 108 and 110, respectively, of the receiving bracket 86. Fasteners 112 and 114 may be located through the aligned openings 62 and 94 and 66 and 96 thereby fastening the attachment bracket 48 and the receiving bracket 86 together.

The attachment bracket 48 and the receiving bracket 86 together form the set structure generally referred to as element 120. The set structure 120 is used, not only for fastening the airbag assembly 12 to the instrument panel module 16, but also to guide the airbag assembly to a final installation position on the instrument panel module.

Figure 9:
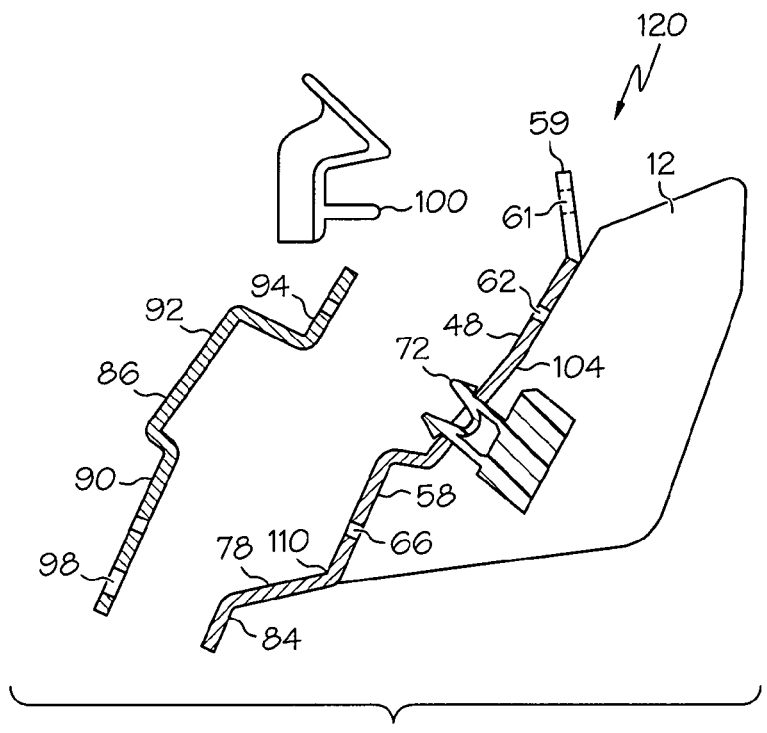
FIGS. 9-12 illustrate an embodiment of a process for installing the airbag assembly of FIG. 5 to the instrument panel module.

Referring to FIG. 9, the airbag assembly 12 is shown removed from the instrument panel module 16. As one example, FIG. 9 may illustrate the airbag assembly 12 being manually positioned by the installer near the instrument panel module 16 for installation. As another example, the airbag assembly 12 may be positioned near the instrument panel 16 by any other suitable method.

Figure 10:
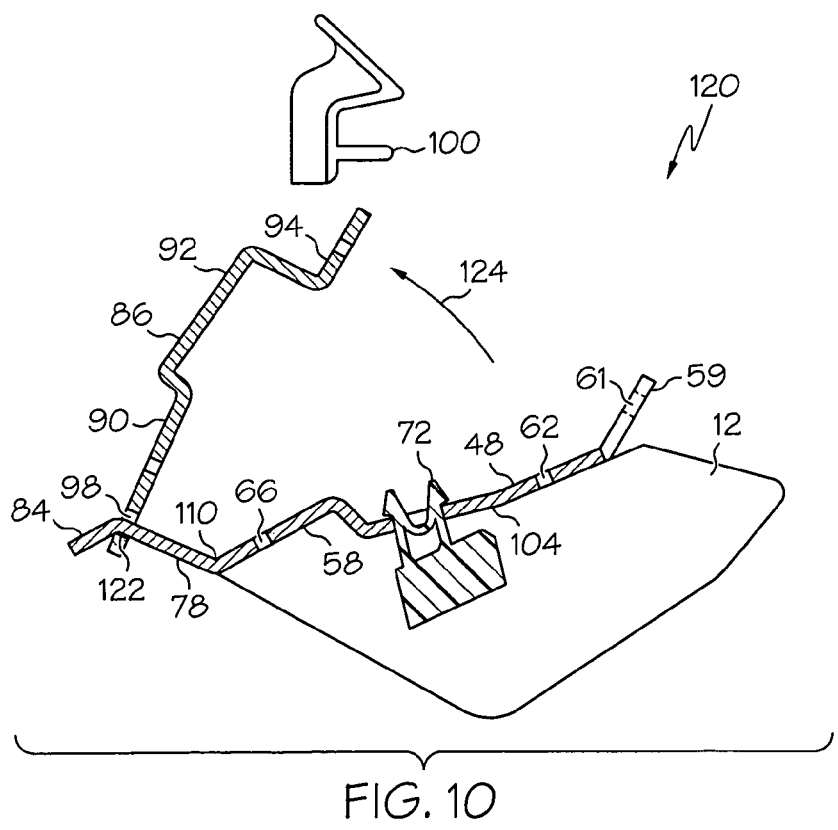

Referring now to FIG. 10, the hook receiving slot 98 in the receiving bracket 86 is sized and positioned to receive the hook portion 78 of the attachment bracket 48. The crook portion 84 can catch a lower surface 122 of the hook receiving slot 98 thereby providing a datum that can be used to align the airbag assembly 12 for installation. In other words, the lower surface 122 can serve as a guide to position the airbag assembly 12 for rotation in the direction of arrow 124 toward the final installation position.

Figure 11:
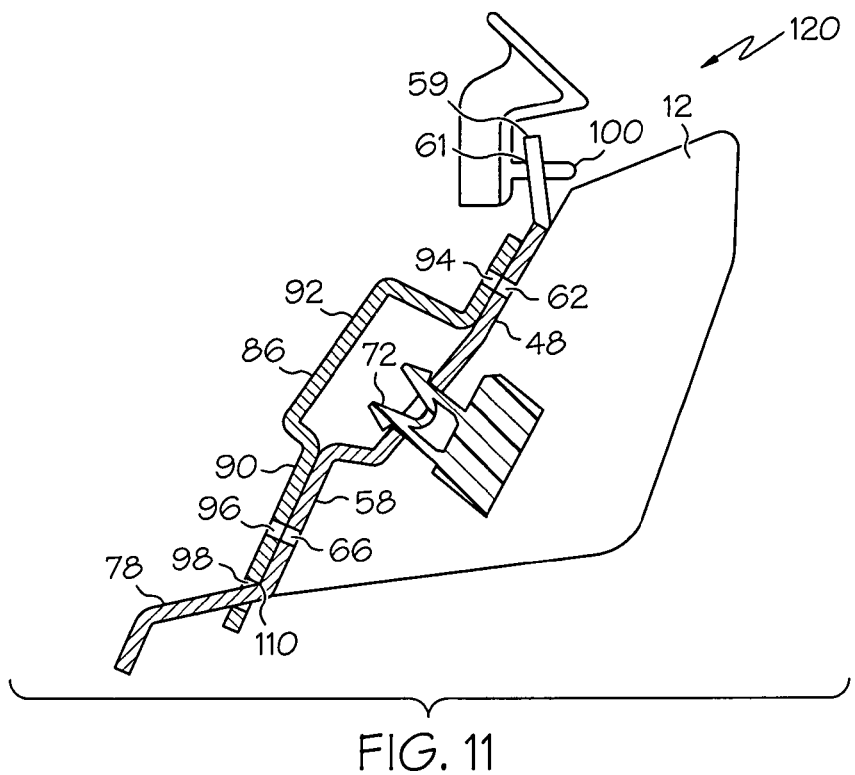

Referring to FIG. 11, the airbag assembly 12 is illustrated in the final installation position. The protrusion 100 received within the opening 61 provide another datum that is used to align the openings 62 and 94 and 66 and 96. As can be seen, a distance between the hook receiving slot 98 in the receiving bracket 86 and the protrusion 100 is selected to correspond to a distance between the hook portion 78 of the attachment bracket 48 and the opening 61 of the attachment bracket such that the hook portion can be received in the hook receiving slot with the protrusion received by the opening 61. Once the airbag assembly 12 is positioned in the illustrated final installation position, the airbag assembly remains in the final installation position without any need for additional support as the vehicle 10 moves along the assembly line. In this final installation position, the airbag assembly 12 may be removed from the instrument panel module 16 manually without removing any fasteners. However, absent any such removal force, the airbag assembly 12 remains in the final installation position.

Figure 12:
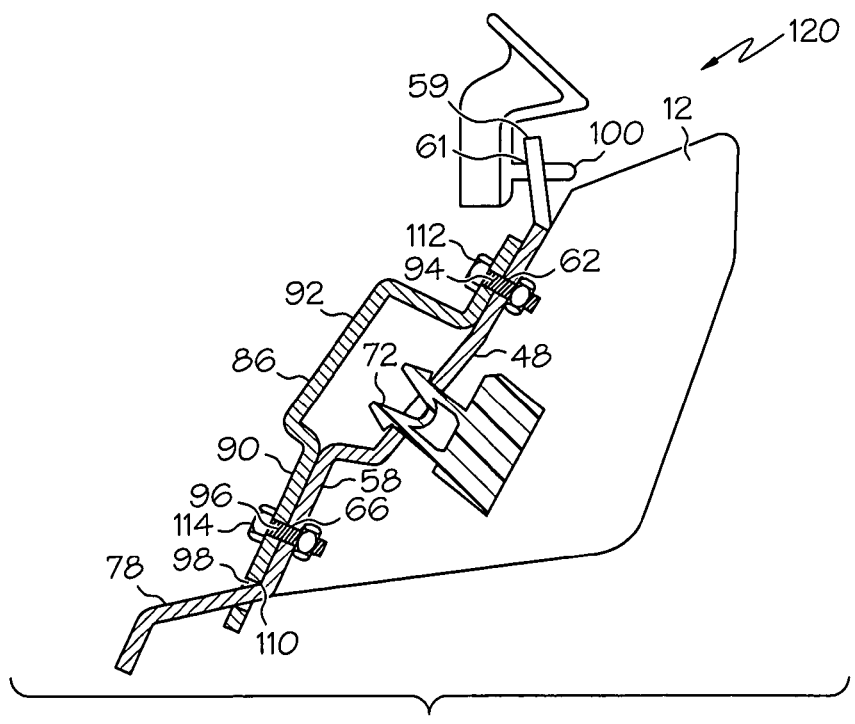

Referring to FIG. 12, after the airbag assembly 12 is placed in the final installation position, the fasteners 112 and 114 may be located through the aligned openings 62 and 94 and 66 and 96 thereby fastening the attachment bracket 48 and the receiving bracket 86 together. The fasteners 112 and 114 may prevent any removal of the airbag assembly 12 from the instrument panel module 16 even in the presence of a removal force. To remove the airbag assembly 12 from the instrument panel module 16, the fasteners 112 and 114 are first removed and then the removal force applied.

Figure 13:
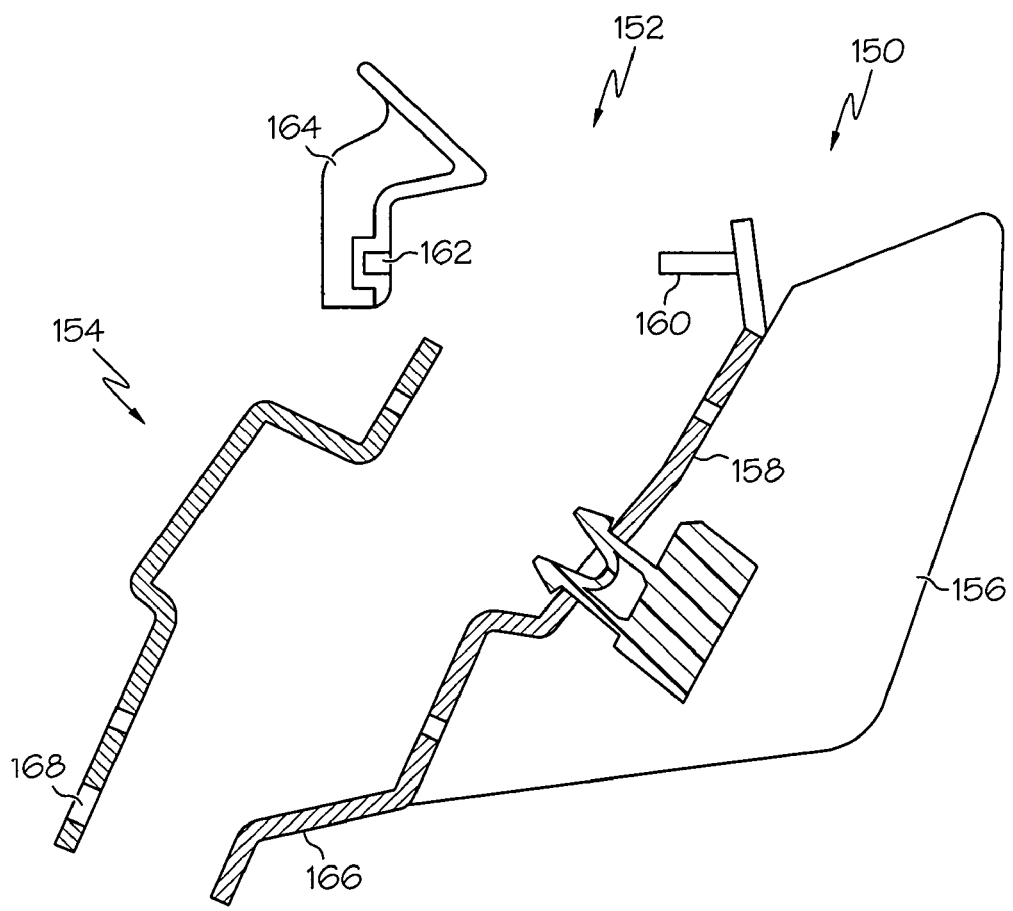
FIG. 13 is a diagrammatic section view of another embodiment of an airbag assembly and instrument panel module with set structure.

FIG. 13 illustrates another embodiment of an airbag assembly 150 that includes another embodiment of set structure, generally referred to as element 152, for use in positioning the airbag assembly on an instrument panel module 154. In this embodiment, the airbag assembly 150 includes a airbag door assembly 156 (e.g. formed of a resin material) through which an airbag exits and an attachment bracket 158. Attachment bracket 158 includes a protrusion 160 or other protrusion type such as a mushroom-shaped protrusion with an enlarged head portion that is sized and located to be received within a slot 162 of mounting structure 164. Attachment bracket 158 includes a hook portion 166 that is sized to be received within a hook receiving slot 168 in a receiving bracket in a fashion similar to that described above.

The above-described set structure allows the airbag assembly to be placed in a final installation position at one location along the assembly line and to be fastened in the final installation position at a downstream location along the assembly line. The set structure maintains the position of the airbag assembly in the final installation position as the vehicle moves along the assembly line without any additional securing force. The set structure is arranged and positioned to properly align the airbag assembly with the instrument panel module such that a fastener may be installed to secure the airbag assembly the instrument panel module without any need for repositioning the airbag assembly relative to the instrument panel module. In some embodiments, the set structure provides a means for maintaining a position of the airbag assembly on the instrument panel in a final installation position without fastening the airbag assembly to the instrument panel as the vehicle moves along the assembly line for a downstream fastening operation where the airbag assembly is fastened to the instrument panel module. While the above description focuses on an airbag assembly, the set structure may be used on other components to be installed and receiving components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assembly for use in a vehicle, comprising:
    an instrument panel module including a receiving bracket including a hook receiving slot and a protrusion; and
    an airbag assembly including an attachment bracket including a hook portion and an opening;
    wherein, during assembly, the hook receiving slot being sized and arranged to receive the hook portion of the attachment bracket and the opening of the attachment bracket being sized and arranged to receive the protrusion to maintain the airbag assembly in a final installation position;
    wherein a bottom portion of the attachment bracket and the receiving bracket both include fastener openings that align once the airbag assembly is placed in the final installation position with the protrusion received in the opening of the attachment bracket and the hook portion received by the hook receiving slot in the receiving bracket.

2. The assembly of claim 1, wherein the hook portion is at a bottom of the attachment bracket and the opening is at a top portion of the attachment bracket.

3. The assembly of claim 2, wherein the attachment bracket is forward of an airbag door assembly.

4. The assembly of claim 3, wherein the airbag door assembly includes a clip that is received through a clip receiving opening in the attachment bracket.

5. The assembly of claim 4, wherein the receiving bracket includes a recess that is sized to receive the clip extending through the attachment bracket.

6. The assembly of claim 1, wherein contact between the hook receiving slot and the hook portion provides a datum that aligns the opening of the attachment bracket with the protrusion during assembly.

7. A vehicle comprising:
    an instrument panel module including a receiving bracket including a hook receiving slot and a protrusion; and
    an airbag assembly including an attachment bracket;
    wherein the receiving bracket and attachment bracket have contact surfaces that provide a datum that guides the airbag assembly from an unsecured position toward a final installation position;
    wherein a bottom portion of the attachment bracket and the receiving bracket both include fastener openings that align once the airbag assembly is placed in the final installation position with the protrusion received in an opening of the attachment bracket and a hook portion of the attachment bracket is received by the hook receiving slot in the receiving bracket.

8. The vehicle of claim 7, wherein the attachment bracket includes a the hook portion defining one of the contact surfaces and the receiving bracket has the hook receiving slot that defines another of the contact surfaces.

9. The vehicle of claim 7, wherein the attachment bracket comprises the opening at a top portion of the attachment bracket, the opening sized to receive the protrusion of the receiving bracket with the hook portion received by the hook receiving slot of the receiving bracket.

10. The vehicle of claim 7, wherein the airbag assembly includes an airbag door assembly including a clip that is received through a clip receiving opening in the attachment bracket.

11. The vehicle of claim 10, wherein the receiving bracket includes a recess that is sized to receive the clip extending through the attachment bracket.

12. An assembly for use in a vehicle, comprising:
    an instrument panel module including a receiving bracket including a hook receiving slot and a protrusion; and
    an airbag assembly including an attachment bracket including a hook portion and an opening;
    wherein, during assembly, the hook receiving slot being sized and arranged to receive the hook portion of the attachment bracket and the opening of the attachment bracket being sized and arranged to receive the protrusion to maintain the airbag assembly in a final installation position;
    wherein the hook portion is at a bottom of the attachment bracket and the opening is at a top portion of the attachment bracket;
    wherein the attachment bracket is forward of an airbag door assembly, the airbag door assembly including a clip that is received through a clip receiving opening in the attachment bracket;
    wherein the receiving bracket includes a recess that is sized to receive the clip extending through the attachment bracket.

13. The assembly of claim 12 wherein the clip is formed integrally with the airbag door assembly.

14. The assembly of claim 12, wherein a bottom portion of the attachment bracket and the receiving bracket both include fastener openings that align once the airbag assembly is placed in the final installation position with the protrusion received in the opening of the attachment bracket and the hook portion received by the hook receiving slot in the receiving bracket.

* * * * *

UNITED STATES PATENT AND TRADEMARK OFFICE
CERTIFICATE OF CORRECTION

PATENT NO. : 8,096,575 B2  Page 1 of 1
APPLICATION NO. : 12/478886
DATED : January 17, 2012
INVENTOR(S) : Craig Paul Voyer et al.

It is certified that error appears in the above-identified patent and that said Letters Patent is hereby corrected as shown below:

Claim 8, column 8, line 2, change "a the hook" to "the hook"

Signed and Sealed this
Thirteenth Day of March, 2012

David J. Kappos
*Director of the United States Patent and Trademark Office*